US008494989B1

(12) United States Patent
VanDerHorn et al.

(10) Patent No.: US 8,494,989 B1
(45) Date of Patent: Jul. 23, 2013

(54) COGNITIVE NETWORK MANAGEMENT SYSTEM

(75) Inventors: Nathan A. VanDerHorn, Cedar Rapids, IA (US); Benjamin J. Haan, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 320 days.

(21) Appl. No.: 12/885,508

(22) Filed: Sep. 18, 2010

(51) Int. Cl.
*G06F 15/18* (2006.01)
*G06F 15/173* (2006.01)

(52) U.S. Cl.
USPC ............................................. 706/13; 709/223

(58) Field of Classification Search
USPC ........................................................ 706/13
See application file for complete search history.

(56) References Cited

U.S. PATENT DOCUMENTS 7,843,822 B1 * 11/2010 Paul et al. ..................... 370/230

OTHER PUBLICATIONS

M. Sloman, "Policy driven management for distributed systems," Journal of Network and Systems Management, vol. 2, pp. 333-360, 1994.
N. Sherdian-Smith, "A distibuted policy-based network management (pbnm) system for enriched experience networks and trade; (eens)," 2003.
R. Thomas, D. Friend, L. Dasilva, and A. McKenzie, "Cognitive networks," Cognitive Radio, Software Defined Radio, and Adaptive Wireless Systems, pp. 17-41, 2007.
A. Granados, "A genetic algorithm for network transport protocol parameter optimization," Master's thesis, University of West Florida, 2009.
T. Rondeau, C. Rieser, B. Le, and C. Bostian, "Cognitive radios with genetic algorithms: intelligent control of software defined radios," in SDR forum technical conference, vol. 100, 2004, pp. 3-8.
Z. Zhao, S. Xu, S. Zheng and J. Shang, "Cognitive radio adaptation using particle swarm optimization," Wireless Communications and Mobile Computing, vol. 9, No. 7, pp. 875-881,2008.
R. S. Sutton and A. G. Barto, Reinforcement Learning: An Introduction. Cambridge, Massachusetts: MIT Press, 1998.
S. Khattab, D. Mosse, and R. Melhelm, "Jamming mitigation wireless networks: Reactive or proactive?" in Proceedings of the 4th international conference on Security and privacy in communication netowrks. ACM, 2008, p. 27.

\* cited by examiner

*Primary Examiner* — Jeffrey A Gaffin
*Assistant Examiner* — Nathan Brown, Jr.
(74) *Attorney, Agent, or Firm* — Donna P. Suchy; Daniel M Barbieri (57) ABSTRACT

This disclosure describes a cognitive network management system (CNMS) for managing a communication node including a radio platform. The system includes an engines layer including at least one sensor engine configured to collect sensor information relating to a location of the communication node and also includes a CNMS core including at least a database storing system settings and policies. The CNMS core is configured to communicate with the engines layer, receive the sensor information and store it in the database, and control the operations of engines layer and the radio platform based on the policies. The system further includes a cognition/learning based analysis module configured to receive the sensor information from the CNMS core, to analyze the effects of the policies based on the sensor information, and to modify the policies and store them in the database to improve system performance.

15 Claims, 11 Drawing Sheets

COGNITIVE NETWORK MANAGEMENT SYSTEM

BACKGROUND

Mobile ad-hoc networks (MANETs) are becoming increasingly popular systems, especially for military use. In areas where a pre-established network infrastructure is not available, such as a natural disaster area or a remote military installation, MANETs can be deployed quickly to create a self-forming communication network without the need for manual configuration or pre-planning. Due to the complex and dynamic nature of MANETS, conventional network management approaches are generally difficult to implement and impractical to operate and maintain. The lack of a centralized management infrastructure and the dynamic nature of the network make it unrealistic to use centralized services for policy reasoning and dissemination. Thus, there exists a need for policy services for tactical network environments to be distributed, agile and adaptive to different operational conditions and resource availability.

SUMMARY

In view of the foregoing, the following disclosure presents a Cognitive Network Management System (CNMS) that is configured to provide automated and policy-based real time network management for complex tactical networks. The system introduces a lightweight and efficient policy management infrastructure designed to mitigate the need for centralized network management, to reduce operator hands-on time, and to increase network reliability. CNMS provides reasoning and enforcement mechanisms for the on-demand management of network topology and communication resources. Integrated learning components allow CNMS to adapt at runtime, creating and distributing new policies for unanticipated networks conditions and application requirements.

This disclosure describes a cognitive network management system (CNMS) for managing a communication node including a radio platform. The system includes an engines layer including at least one sensor engine configured to collect information about the node and its surrounding network. Information collection engines include but are not limited to GPS position awareness, spectrum usage, communication channel usage, and node resource utilization. The system also includes a CNMS core including at least a database storing system information and policies. The CNMS core is configured to communicate with the engines layer, receive the sensor information and store it in the database, and control the operations of engines layer and the radio platform based on the policies. The system further includes a cognition/learning based analysis module configured to receive the sensor information from the CNMS core, to analyze the effects of the policies based on the sensor information, and to modify the policies and store them in the database to improve system performance. The system may be further configured wherein the engines layer further includes a learning engine configured to optimize the system settings, wherein the CNMS core is further configured to receive the system settings from the learning engine and stores the system settings in the database, and wherein the cognition/learning based analysis module is further configured to analyze the effects of the policies based on the sensor information and the system settings.

DETAILED DESCRIPTION

The following disclosure presents a CNMS architecture, with special attention to its unique features and capabilities. The functionality and preferred embodiments will be described through the following illustrative use-cases and examples. The functionalities and embodiments discussed will include policy learning components and mechanisms for policy sharing leading to overall system adaptation. Policy learning in CNMS is intrinsically distributed, and based on network performance observations for the refinement of contexts, and actions. This disclosure will describe two examples for policy adaptation, one based on topology control for data-rate maintenance, and one based on adaptive frequency hopping strategies for interference mitigation. However, it should be understood that other examples of policy adaptation may be utilized by the CNMS consistent with the basic functionalities discussed below.

Figure 1:
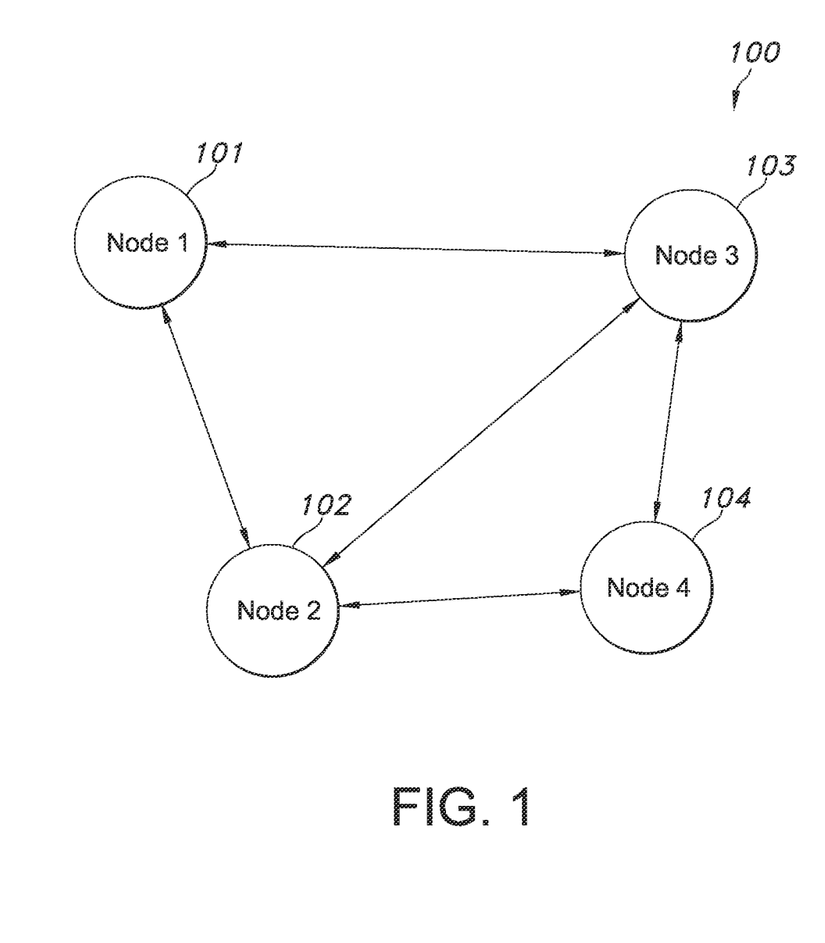
FIG. 1 shows a general mobile ad-hoc network.

FIG. 1 shows a general example of a MANET (mobile ad hoc network). MANET 100 includes multiple communication nodes 101-104 that are configured to wirelessly communicate with each other. MANETs are self configuring networks of mobile devices connected by wireless links (e.g., 802.11, Rockwell Collins TTNT, etc.). In order for MANETs to form, they require some sort of reactive or proactive routing protocol such as Optimized Link State Routing (OLSR) or Ad-hoc On-demand Distance Vector Routing. Although the routing protocol is required, the performance and stability of the MANET can be enhanced using a system such as the CNMS. The systems and techniques of the present disclosure seek to create a cognitive network from the general MANET depicted in FIG. 1. In a cognitive network, each node in the system is responsible for monitoring local network behavior and adjusting operational parameters based upon mission policies. In addition, cognitive nodes have the ability to learn new policies that can be shared with other nodes, improving their ability to adapt to similar network conditions in the future.

To achieve this goal, CNMS-enabled nodes build an experiential knowledgebase from node-state information and operational context. State information is locally provided by a node's engines, which are independent components providing data such as GPS position, spectrum availability, terrain information, quality of service (QoS), and other network statistics. Each node also has a mission description that defines its objective tasks and optimization criteria, as well as a set of policies that define its regulatory constraints and operational parameter bounds. For example policies might define a set of disallowed frequencies, or a power level that the transmitter must remain below. Armed with that information, each node seeks to optimally allocate resources to enable or enhance overall network qualities such as topology connectivity, reliability, robustness, etc.

Another advantage of CNMS is moving the burden of network management away from a network operator and into a networked device. That is, nodes in a cognitive network are configured to have the ability to monitor local network metrics such as, link utilization, packet drop rate and signal to noise ratio. The role of CNMS is to then automatically adjust certain operational parameters to enhance (e.g., decrease packet loss, increase throughput, etc.) individual and network wide system performance, not only following operational and regulatory policies, but also learning, from experience, new operational policies that can be used in the future by other nodes in a similar context. Currently, most solutions applied to network planning and policy management are done offline, as part of a pre-planning phase, and tend to rely on background knowledge and expertise from network managers and operators. The CNMS creates a management system that mimics the decisions typically made by network operators. This will reduce the operator hands on time and create a more robust network.

One approach to MANET networking considers a scenario where nodes have multiple interfaces, possibly connected to highly heterogeneous links or tactical radios. As such, the proposed system is configured to be capable of using multiple waveforms, each having different characteristics. That is, in some situations no single waveform will accommodate all network traffic without (potentially significant) compromises, particularly in resource constrained environments.

The concept behind the network architecture of the present disclosure is to augment a homogeneous mesh network with additional waveforms that can be used to fulfill specific data transport requirements. That is, instead of developing a single waveform capable of handling all network traffic, the system may be configured to handle multiple waveforms optimized for specific purposes (latency, bandwidth efficiency, range, etc.). The intent is for the mesh waveform to be used to exchange pertinent network metrics and provide user data payload support. Heavier data traffic is then accomplished via on demand support waveforms. This disclosure will collectively refer to these additional waveforms as the "socket" waveform(s). As one example, IEEE 802.11 protocols may be used for the mesh communication network and utilize the Universal Software Radio Peripheral (USRP), an inexpensive software defined USB-based radio, as the reconfigurable, on demand socket waveform.

Figure 2:
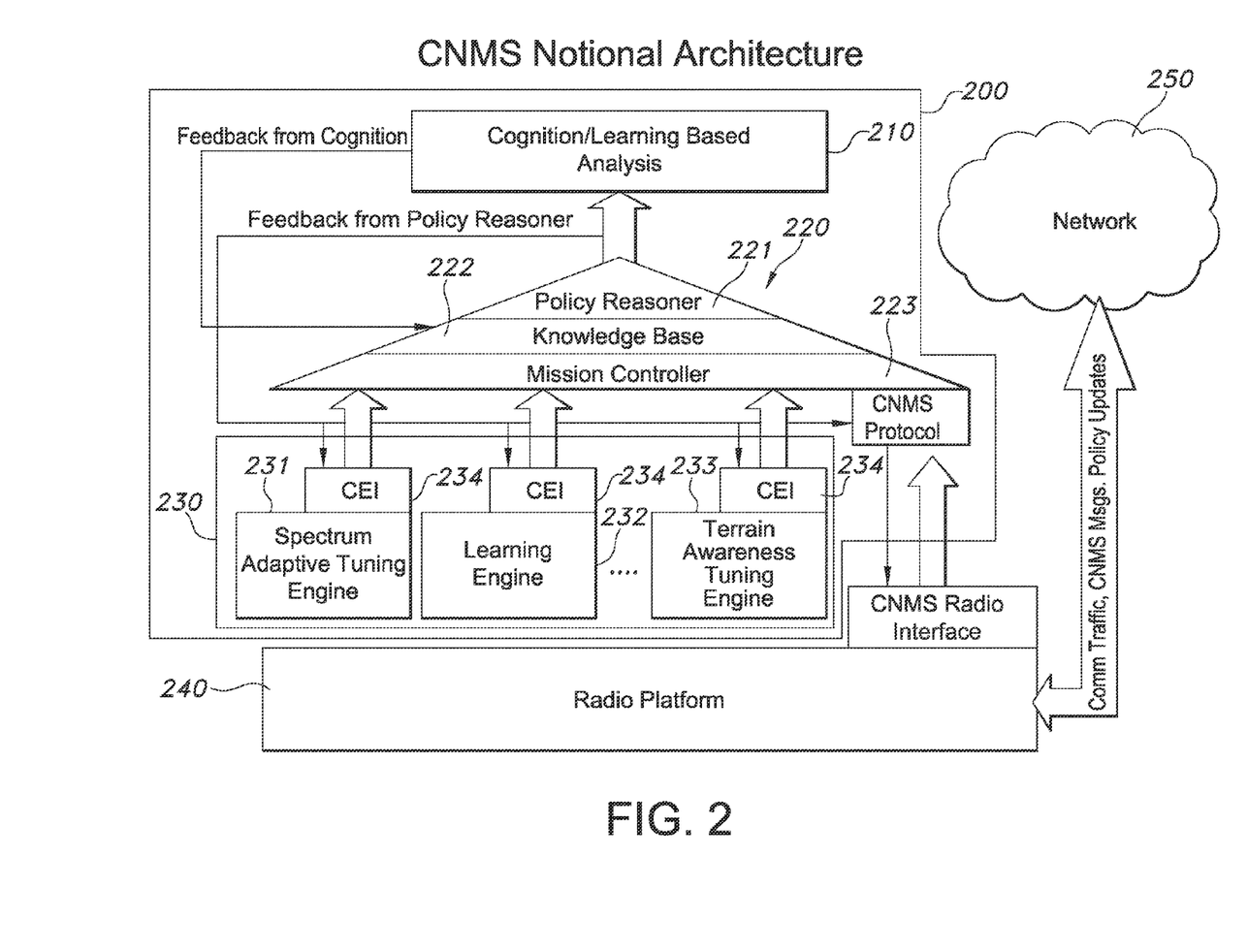
FIG. 2 shows a notional CNMS architecture according to one embodiment of the disclosure.
Figure 4:
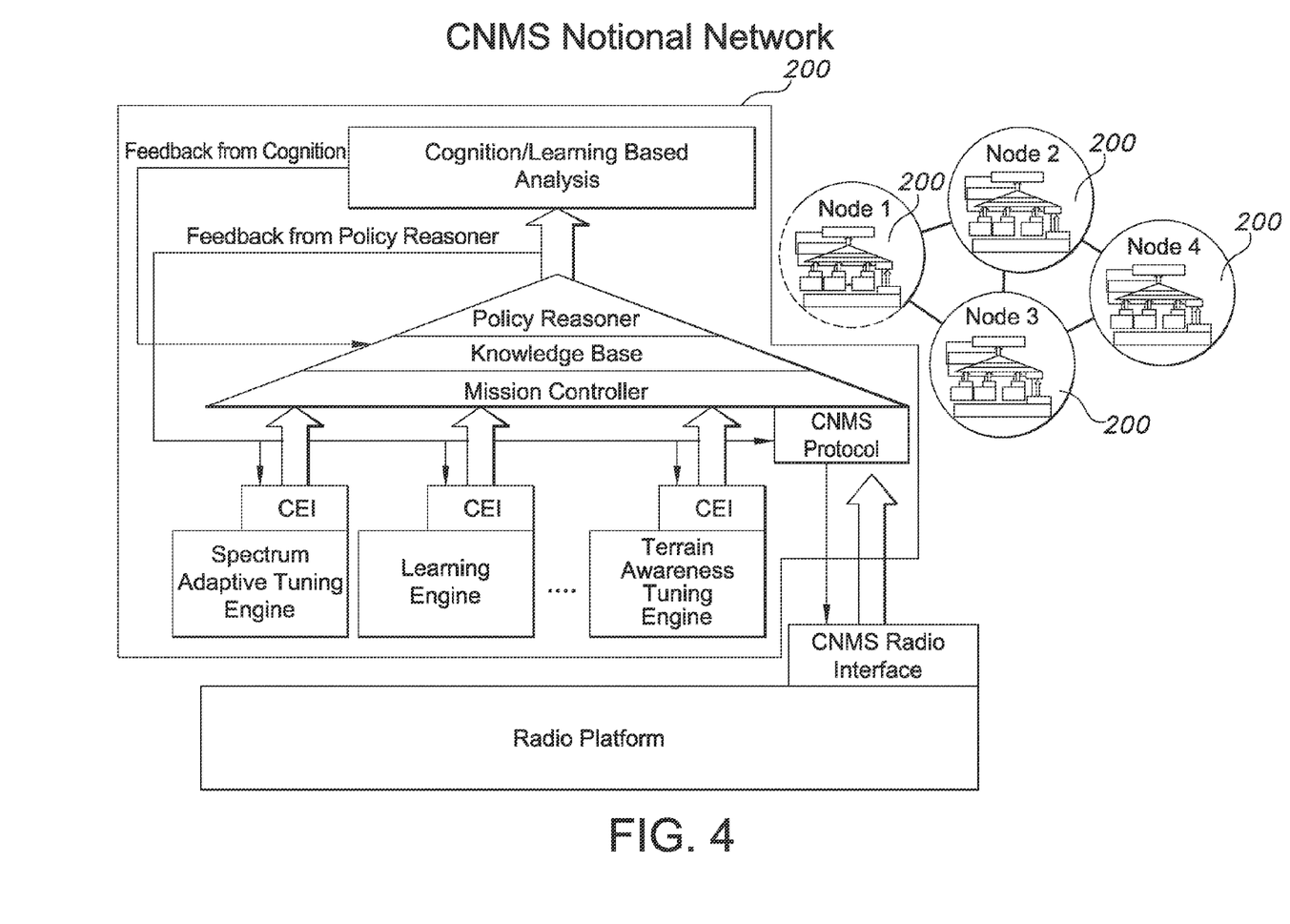
FIG. 4 shows a notional CNMS architecture distributed in each node of a MANET.

FIG. 2 shows a notional CNMS architecture according to one embodiment of the disclosure. CNMS 200 is subdivided into 3 main layers, as illustrated in FIG. 2. The cognition/learning based analysis module 210, the CNMS core 220, and the engine layer 230. These three layers are preferably implemented as software running on a microprocessor. However, any combination of software, firmware, and/or dedicated hardware may be employed to carry out the functionalities of each layer. Also, note that the CNMS is entirely resident within one node using a radio platform 240 to communicate into a network 250. As will be explained in more detail below, the communications into the network may include communication traffic, CNMS messages, and policy updates. CNMS messages are sent throughout the network and aid in gathering information about network performance and relative statistics. CNMS messages are typically generated by sensor engines and serve to fill the knowledgebase with pertinent information about neighboring nodes and the network environment. Policy updates are also sent throughout the network when a node learns a new policy that may be helpful to other nodes. FIG. 4 shows how CNMS 200 may be included in each node of a basic MANET such as shown in FIG. 1.

Engines layer 230 consists of a series of engines that supply tools and input to CNMS core 220. Engines come in two flavors, sensor engines and learning engines. Sensor engines collect, filter, and report specific information to the node's knowledgebase 222 in CNMS core 220. As mentioned above, sensor engines may collect information such as spectrum availability, GPS position, radio resource utilization and surrounding terrain information. An example of a sensor engine is the terrain awareness tuning engine 233. This engine is configured to collect GPS information from the radio as well as surrounding radios in the network and can influence waveform selection based upon terrain type. That is, if it is known that a node is in an area of foliage covered terrain a policy might advise that a UHF band waveform is preferred so a Ku band waveform. Another example of a sensor engine is the spectrum adaptive tuning engine 231. This engine is attached to a wideband spectrum sensor that collects spectrum information to update the knowledgebase. Based upon this information, the CNMS core can make informed decisions as to what frequency to use for optimal performance.

Learning engines supply tools that the system can use to do more advanced tasks such as optimization and clustering. As one example, learning engine 232 may be an optimization engine. This engine is a tool that can be used to optimize system settings such as transmitter power, detection thresholds, and transmission rates using learning techniques including genetic algorithms such as those described by A. Granados in "A genetic algorithm for network transport protocol parameter optimization," Master's thesis, University of West Florida, 2009 and T. Rondeau, C. Rieser, B. Le, and C. Bostian, in "Cognitive radios with genetic algorithms: intelligent control of software defined radios," *SDR forum technical conference*, vol. 100, 2004, pp. 3-8, both of which are hereby incorporated by reference. In addition, particle swarm optimization techniques may also be utilized, such as those described by Z. Zhao, S. Xu, S. Zheng, and J. Shang, in "Cognitive radio adaptation using particle swarm optimization," *Wireless Communications and Mobile Computing*, vol. 9, no. 7, pp. 875-881, 2008, which is also hereby incorporated by reference. Genetic and particle swarm algorithms aim to find a sub-optimal yet adequate solutions to complex problems in a short amount of time (faster then brute force search). They do this by intelligently searching the space of available values and using the best known values to guide their search.

Both the sensor engines and the learning engines communicate with CNMS core 220 through a CNMS Engine Interface (CEI) 234. The CEI is simply an Application Programming Interface (API) that defines the method by which the CNMS core can intercommunicate with the respective engine.

The second layer of CNMS 200 is the CNMS core 220 and it itself may be considered as subdivided in three parts, an XML knowledge base 222, a policy reasoner 221, and a mission controller 223. The CNMS core directs all data flow local and network wide for the CNMS system. Using mission files, the CNMS core directs data from one engine to another allowing different tasks to be performed. For example a "maintain link quality" mission may first get terrain data from the terrain database and los calculations engine 333 (shown in FIG. 3), then if it is determined that a link is about to break due to obstruction, it may then send data to the socket manager 350 to create a multihop link to avoid the obstruction. The CNMS core also used the protocol data exchange XML file 374 (shown in FIG. 3) to determine how often and what local data should be sent to other CNMS nodes. The CNMS core can also interact with engines based on policies. For example a policy may exist that states based on a given location a certain type of link (KU, L-Band, TTNT, etc.) should be used. When this policy fires, the CNMS core will activate the Sockets Manager 350 (shown in FIG. 3) and supply the necessary data to change the current link types.

The XML knowledge base 222 stores system information and policies in an XML format for easy analysis and transmission to other CNMS nodes. While XML is a preferred format, any type of database may be used. Policy reasoner 221 is configured to make decisions based on the current system state and a set of predefined and/or learned policies. CNMS policies cover a large range of managerial tasks and represent many concepts. Managerial tasks include any task that can optimize node/network performance such as minimizing packet loss rate, jammer avoidance and optimal waveform selection. The mission management controller 223 controls the operation of the overall system based on a set of mission files. By changing missions the operation of the system can be modified. Missions control what policies are loaded and what engines are running at any given time. Missions also control the flow of data throughout the system and control how often tasks such as optimization are performed.

Finally, information and actions from the CNMS core 220 get fed into the cognition/learning based analysis module 210 of the CNMS system. Cognition/learning based analysis module 210 is configured to analyze the effects of decisions made by the myopic lower layers and modify policies to improve long term system performance.

Figure 3:
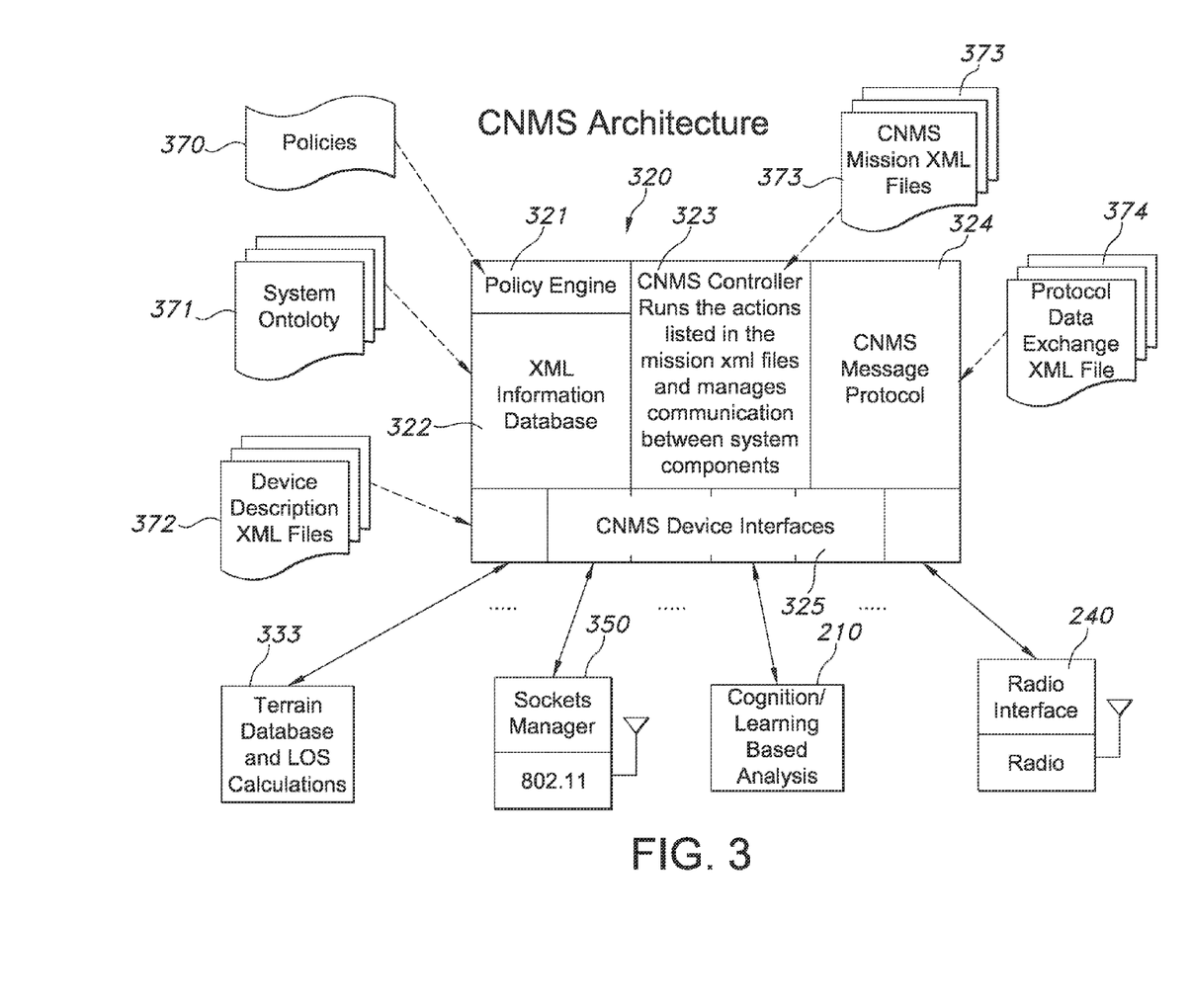
FIG. 3 shows a preferred embodiment of the CNMS architecture.

FIG. 3 shows one example of a preferred embodiment of the CNMS architecture in more detail. In this embodiment, CNMS core 320 includes a policy engine 321 that utilizes a set of learned policies 370 to make decisions concerning the managerial tasks described above. The learned policies 370 may be stored in a memory. Policy engine 321 corresponds to policy reasoner 221 in FIG. 2.

CNMS core 320 further includes an XML information database 322. This database stores all data about devices from device description XML files 372 as well as all data from all devices, engines, and data gathered from CNMS messages. This data may be stored in a tagged format for lookup. Collectively, all this data is shown as system ontology 371 in FIG. 3. XML information database 322 corresponds to knowledge base 222 in FIG. 2.

CNMS core 320 further includes a CNMS controller 323. CNMS controller 323 executes actions listed in the CNMS mission XML files 373 and manages communication between system components. Essentially, CNMS controller 323 manages the interaction between the 3 layers of the CNMS architecture. CNMS controller 323 corresponds to mission controller 223 in FIG. 2.

CNMS core 320 further includes CNMS message protocol module 324. This module gathers information specified in the protocol data exchange XML file 374 and sends this data to other nodes in the network. The protocol data exchange XML file 374, is an XML file that specifies what local data should be sent to other CNMS nodes (GPS data, terrain data, current spectrum data, etc.). This file also specifies how often and to what nodes that data should be sent to (one hop neighbors every 1 sec, two hop neighbors every 30 sec, everyone every 5 min, etc.). CNMS message protocol module 324 also receive protocol exchange messages from other nodes and updates the XML information database.

CNMS core 320 further includes the CNMS device interfaces 325. This interface handles communication with each device/engine via a communication protocol such as TCP, UDP, SNMP or the like. This interface allows for communication between the CNMS core and other layers of the architecture such as cognition/learning based analysis module 210, radio platform 240, 802.11 radio 350 and terrain database and line-of-sight (LOS) calculation engine 333.

Returning to FIG. 2, the following sections describe some of the functionality of the cognition/learning based analysis module 210 in more detail. The CNMS can operate as a strict policy based management system, however, using learning techniques, the system is able to automatically generate new policies and/or adapt existing policies to improve system performance. Below are examples of two scenarios in which learning techniques are used to enhance network performance.

One of the useful network management decisions when using this network paradigm is to determine when to transfer user data over the mesh network and when to open a socket channel. Recall that the mesh data link may be 802.11 (mesh network) and the socket data link (point to point high speed link) may be an USRP radio, however, any radio link can be used so long as one of them is a fully connected mesh and the other is an on demand socket. As mentioned above, the main priority of the mesh network is to pass control and status information to nodes throughout the network. However, under low traffic conditions, it is possible to transfer payload data through the mesh network without incurring the penalty of opening a socket channel. At some point, this payload data may burden the mesh network and is preferably transitioned to a socket channel. In this case, a policy is created to signal socket creation when traffic on the mesh network exceeds a certain threshold. The firing of the policy depends on the threshold for the capacity of the mesh network. This threshold can vary depending upon the utilization of the mesh. For example, if the payload data would consume, say, 40% of the mesh channel it may be OK to transmit this data over the mesh if the current mesh utilization is only 10%. However, if the current mesh utilization is 70% it would be prudent to offload the new flow to a socket because at 110% mesh utilization we are sure to see an increase in packet loss.

An effective policy adaptation mechanism in this scenario is to find the best threshold for mesh network capacity for the current network conditions. For that purpose we identify (or establish) costs for sending data above the capacity of the mesh network (i.e. dropping packets), as well as costs for establishing the socket channel.

One solution for learning the threshold is to use a reinforcement learning approach known as Q-Learning as described by R. S. Sutton and A. G. Barto in *Reinforcement Learning: An Introduction*, Cambridge, Mass.: MIT Press 1998, which is hereby incorporated by reference. The problem of finding the threshold can be specified as a reinforcement learning problem in the following way:

1) Actions:
Mesh: Use the mesh link
Socket: Use the socket link
2) State: Transmission data rate in Mbps (discretized to intervals of 1 Mbps)
3) Cost: The percentage of packets dropped for the respective interface (mesh or socket).

As the socket link is a dedicated channel with a much higher capacity, if you only use packet drop percentage to determine the cost, then the trivial solution would be to always use the socket link. For that reason it is useful to add a constant cost to the socket link.

One proposed approach was tested with simulations for 2, 6 and 10 nodes. In each scenario, half of the nodes are senders and the other half are receivers. All nodes share the aggregate capacity of the mesh network and compete for its bandwidth. In simulations, every 10 seconds the sending nodes uniformly select a TX data rate between 1 Mbps and 10 Mbps. The theoretical capacity of the mesh link is 6 Mbps. The expected outcome is that, as more nodes are sending data on the mesh network, the value for the mesh link on the Q-Learning function will degrade, making us reduce the threshold for creating the socket link.

Figure 5:
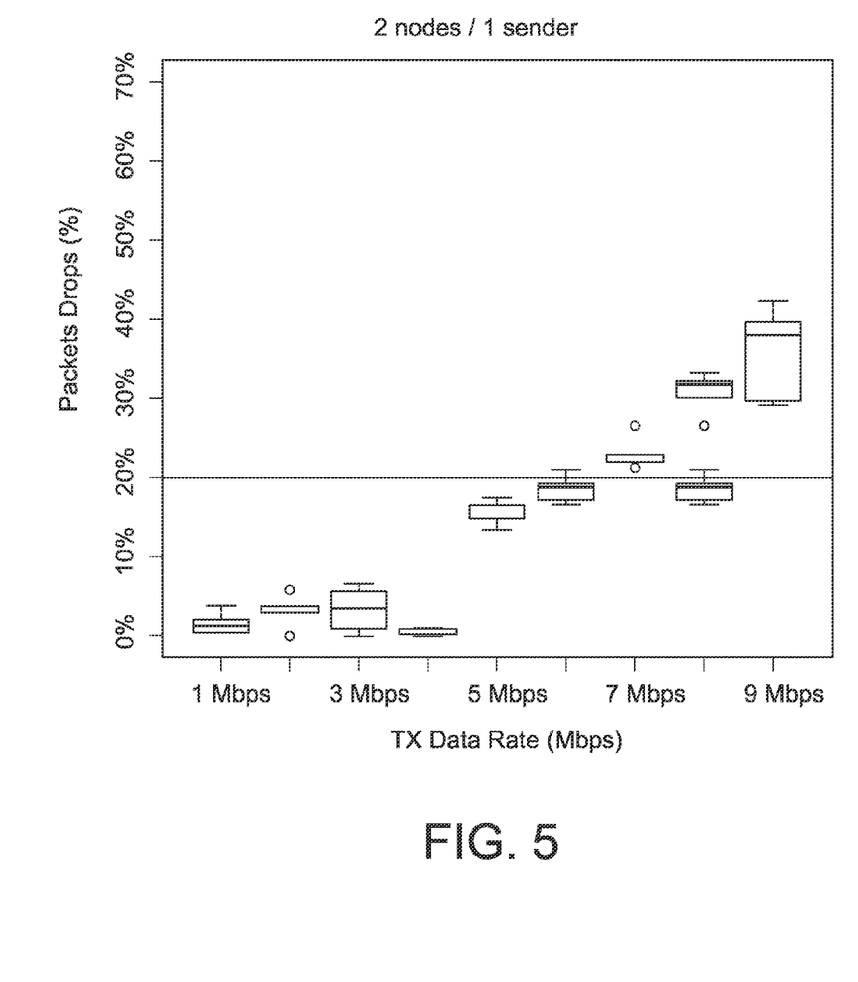
FIG. 5 shows a plot of packet drop rate per data rate in a 2 node network with 1 sender.
Figure 6:
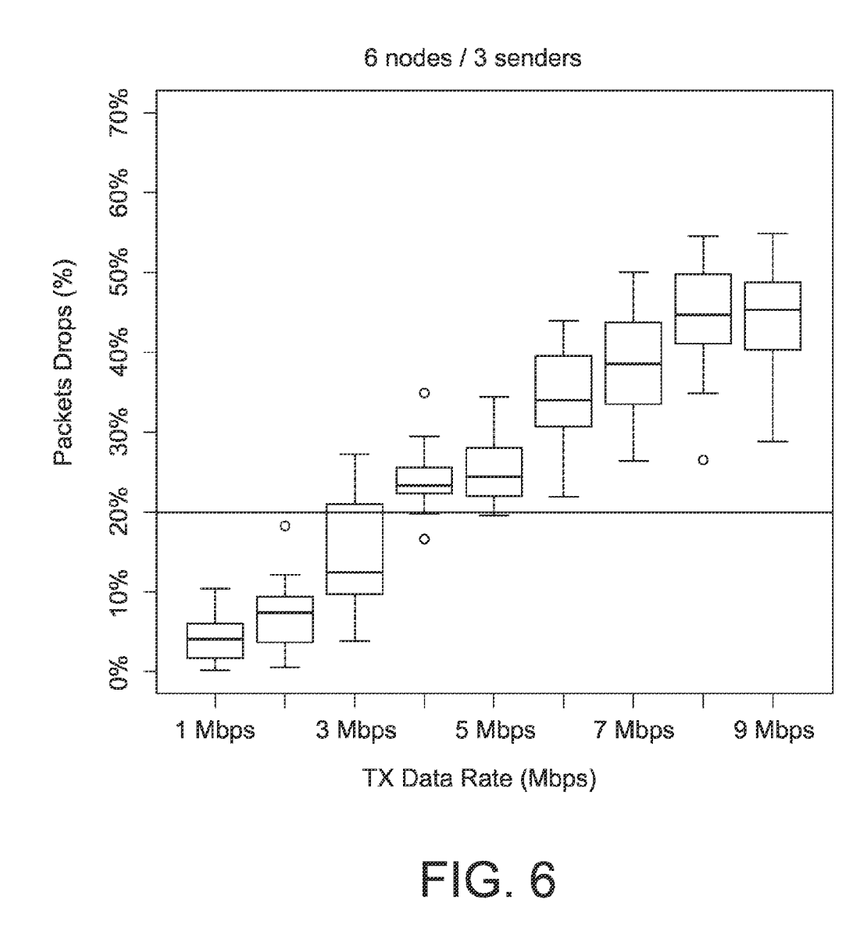
FIG. 6 shows a plot of packet drop rate per data rate in a 6 node network with 3 senders.
Figure 7:
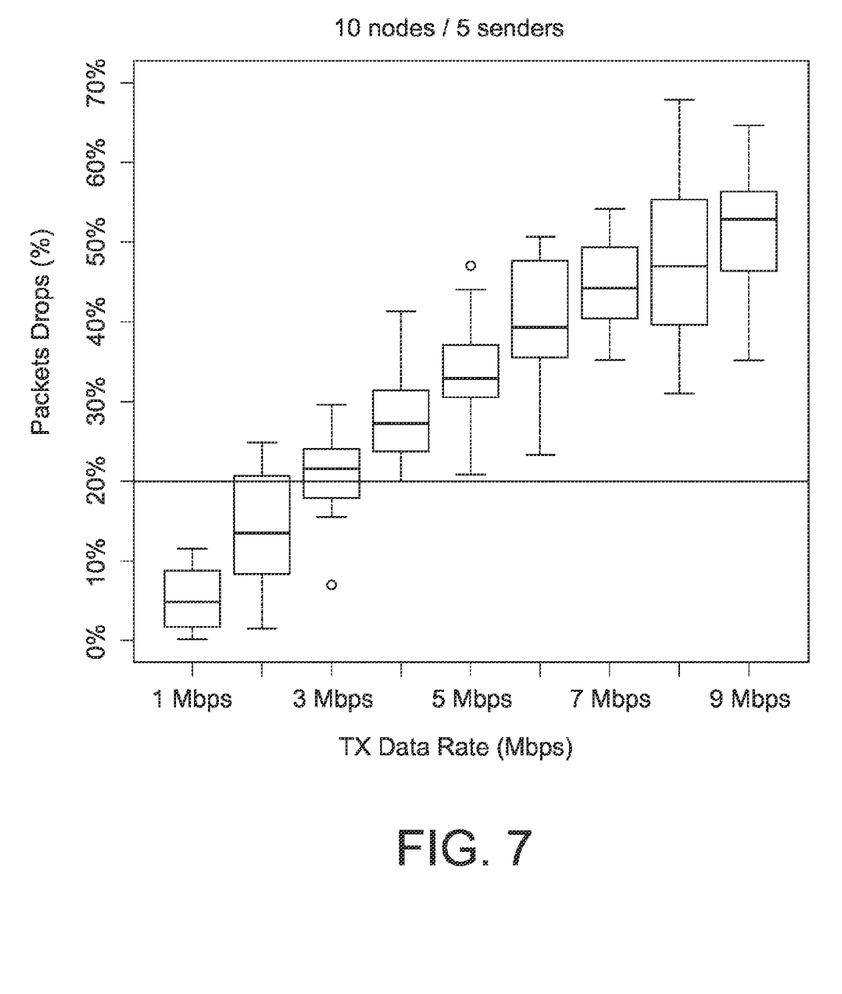
FIG. 7 shows a plot of packet drop rate per data rate in a 10 node network with 5 senders.

Each scenario was run 5 times, and the Q-Learning value function for each node on each run of each scenario was extracted and plotted in FIGS. 5-7. As expected, with a higher number of nodes, the value function for the mesh link decreases, reducing the threshold for creating the socket. If, for example, the cost for the socket link is set to 20%, then for 2 node scenario the threshold is 6 Mbps, because for all rates below 6 Mpbs, the value function is lower than 0.2. Similarly for 6 nodes, the threshold is 3 Mbps; and for 10 nodes, it is 2 Mbps.

Another case in which the CNMS is beneficial is after a socket has been established. Because the socket waveform is configurable, it is beneficial to understand how to mitigate RF interference. Consider that, upon detection of RF interference, a decision is made by the CNMS core on whether to stay or jump to a different channel. Based upon current state information in the knowledgebase and existing policies on how to behave in the event of jammer detection the system will take the appropriate action. Previous studies have shown that a reactive strategy for jamming avoidance is better than a proactive strategy. That is, if a sweeping jammer is detected, the CNMS should remain on the channel and wait for the jamming signal to pass. If, on the other hand, the jammer is single channel interference, the best action is to jump to a new frequency. An effective policy learning strategy for this scenario will identify a strategy that would minimize the effects of interference/jamming, for a given interference profile.

In this scenario the CNMS core periodically checks the packet drop rate for each socket link. Each time the algorithm runs is referred to as a timestep. Whenever the drop rate on a timestep reaches 50%, it is considered that the link has been hit by a jammer. When the CNMS detects a hit, it can take 2 possible actions, stay on the same frequency or jump to a new frequency. The CNMS determines, for an unknown jamming strategy, the best action to take.

To measure the effectiveness of the learning, it is useful to define a metric that indicates how well the algorithm avoids being hit by the jammer. This metric is the proportion of timesteps that a hit to the link is detected (when packet is greater than 50%). The lower the metric, the more effective the learning. For the baseline metric you can first determine how well an agent that follows a fixed strategy (always jump or always stay) does—this is the non-learning strategy. In theory, for a jammer that jumps from one channel to the next on a fixed interval, the jammer will hit the agent that always follows the stay strategy with probability $1/n$, where n is the number of channels. An agent that always follows the jump strategy will get hit by the jammer with probability $1/p$, where p is the jamming interval expressed in timesteps (the number of timesteps that a jammer stays in a channel).

An effective learning algorithm for this problem is to find which strategy is better for an unknown jammer and possibly with a changing hopping frequency. As we already know the theoretical limits for each strategy, we can define that the learning algorithm should at any given moment select the action that minimizes the metric, this is, if $1/n>1/p$ then the agent should select the jump action, otherwise it should select the stay action. So, with n fixed, we need to learn p, and for that it suffices to store a short history of the detected jamming intervals in the XML knowledge base, and use the average to estimate p.

For measuring the effectiveness of the proposed learning algorithm simulations were run where a jammer was randomly changing its jamming interval every 10 jumps. This simulation was run 10 times, and not only for the learning agent, but also for the agents with the fixed strategies.

Figure 8:
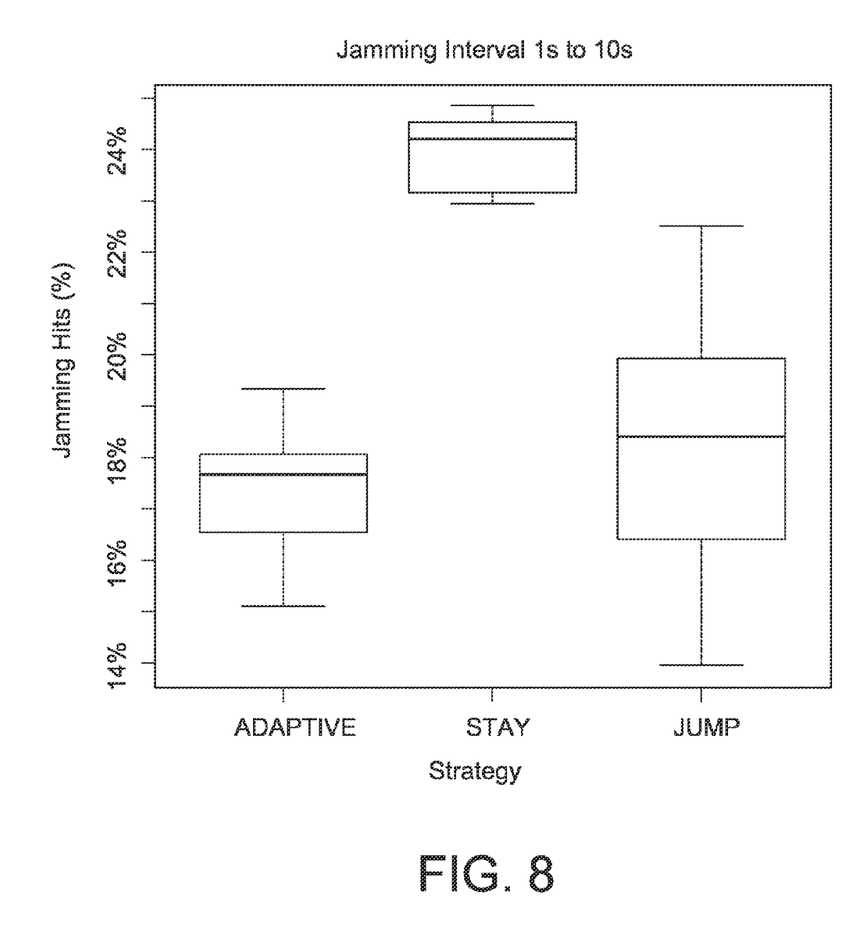
FIG. 8 shows a plot of jamming hit percentage per policy strategy for a jamming interval of 1s to 10s.

FIG. 8 shows the plot for this scenario. In this scenario the learning-based adaptive agent and the jump agent obtained better results than the stay agent, but the adaptive agent has a much lower deviation. For this scenario the expected value for the jammer interval is 5s, making the jump strategy better on average.

Figure 9:
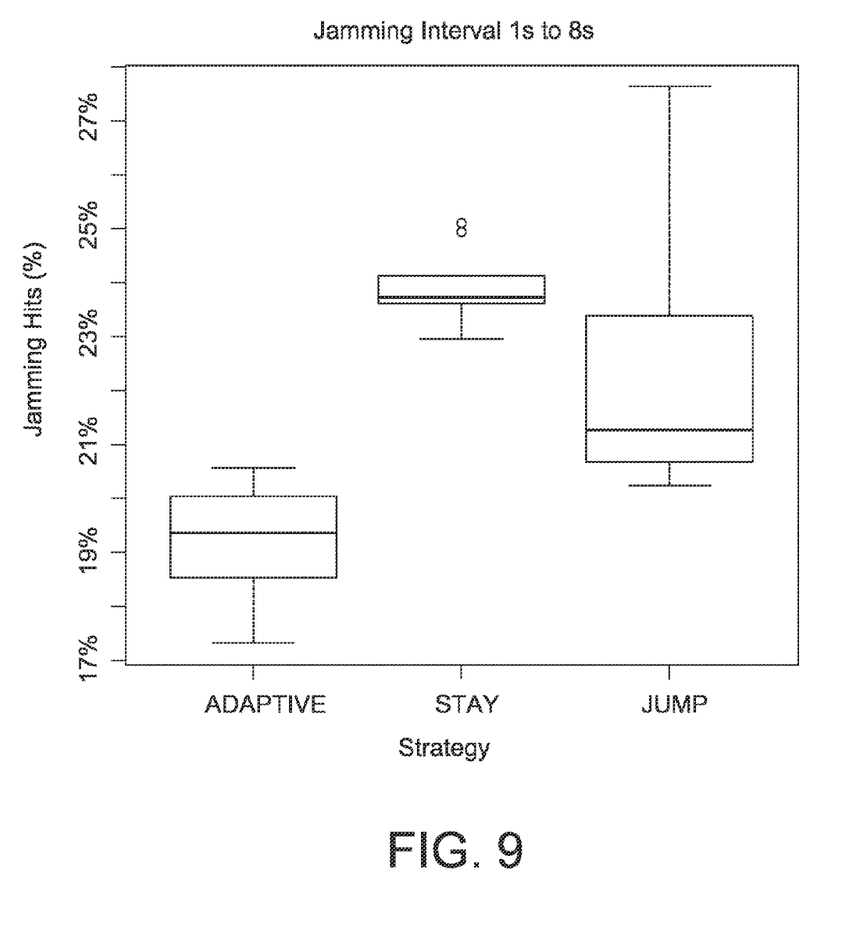
FIG. 9 shows a plot of jamming hit percentage per policy strategy for a jamming interval of 1s to 8s.

Next, we considered a scenario with a smaller jamming interval of 1s to 8s. In this case the expected jamming interval is 4s, making, in theory, both strategies equally effective. FIG. 9 shows the plot for this scenario. In this scenario the adaptive agent is better than both fixed strategy agents. But again the jump agent obtained better results than the stay agent, and in theory they should have had obtained similar results. The reason for this is that as the metric is based on the number of hits, and a hit is measured in each timestep, with higher jamming intervals, the jump agent will get a chance to run longer (remember that the jammer changes intervals every 10 jumps).

Figure 10:
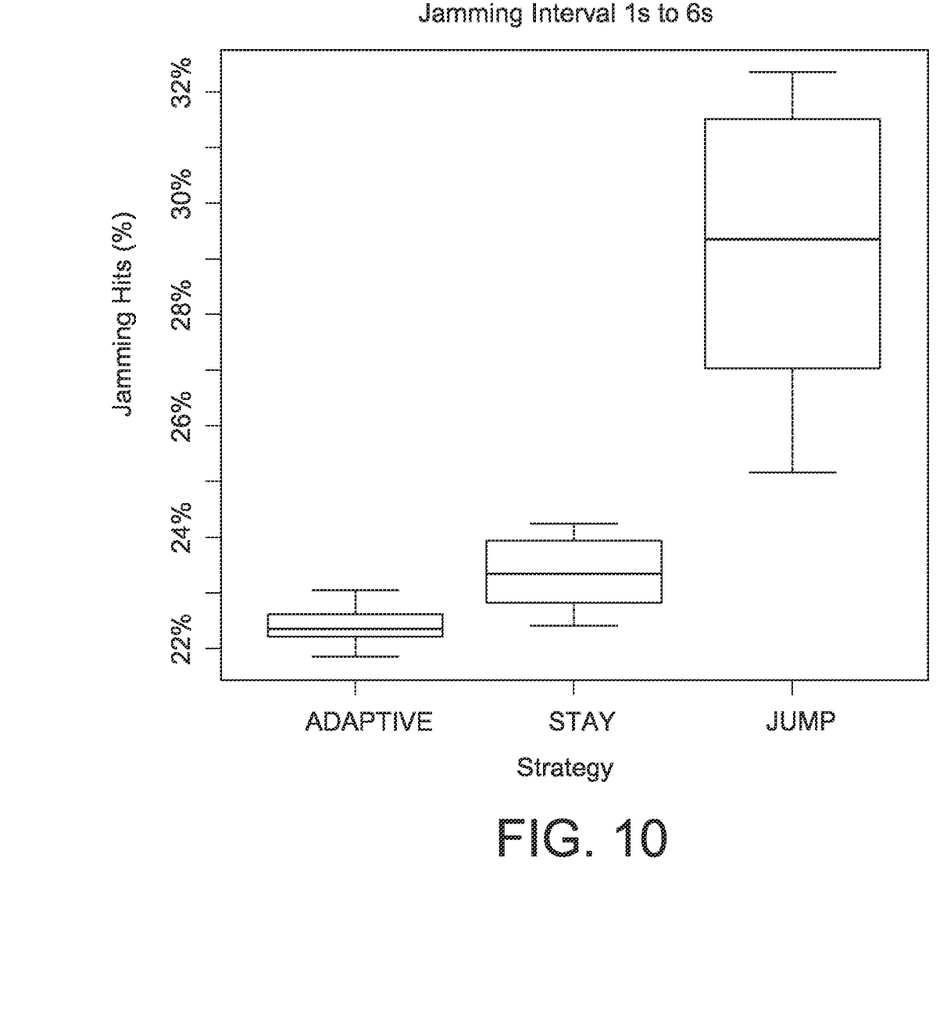
FIG. 10 shows a plot of jamming hit percentage per policy strategy for a jamming interval of 1s to 6s.

Finally we consider a scenario with an even smaller jamming interval between 1s and 6s. In this case the expected jamming interval is 3s, making in theory the stay strategy more effective. FIG. 10 shows the plot for this scenario. In this scenario the adaptive agent is better than both fixed strategy agents. But this time, as predicted, the stay agent obtained better results than the jump agent.

Experimental Results

Experimental results for the above-described CNMS were conducted using a testbed consisting of 5 cognitive nodes. Each node has a standard 802.11 wireless card and a USRP. As mentioned, all nodes are connected in a mesh configuration using the 802.11 link and on demand sockets can be opened using the USRP. In addition, all nodes run a version of the CNMS software. Our testbed demonstration consisted of 4 experiments to illustrate the flexibility and use of CNMS. The following sections describe the experiments in more detail.

The first experiment is to demonstrate mesh network traffic monitoring and dynamic socket creation as discussed above. The system is initiated with very low load traversing the 802.11 mesh, only CNMS generated traffic such as GPS position exchange, socket availability and network usage metrics are consuming mesh bandwidth. Traffic is then added to the mesh in the form of a streaming video. As a predefined policy, we force any node to open a socket when the traffic sourced to the mesh is over 500 kbps. Thus, when the 1 Mbps streaming video is launched, initially over the mesh, the policy is fired and as a result, a socket is immediately opened and the traffic is redirected over the socket link. We note here that we could use the Q-Learning method discussed earlier to adapt the 500k threshold value based upon real mesh loading.

Figure 11:
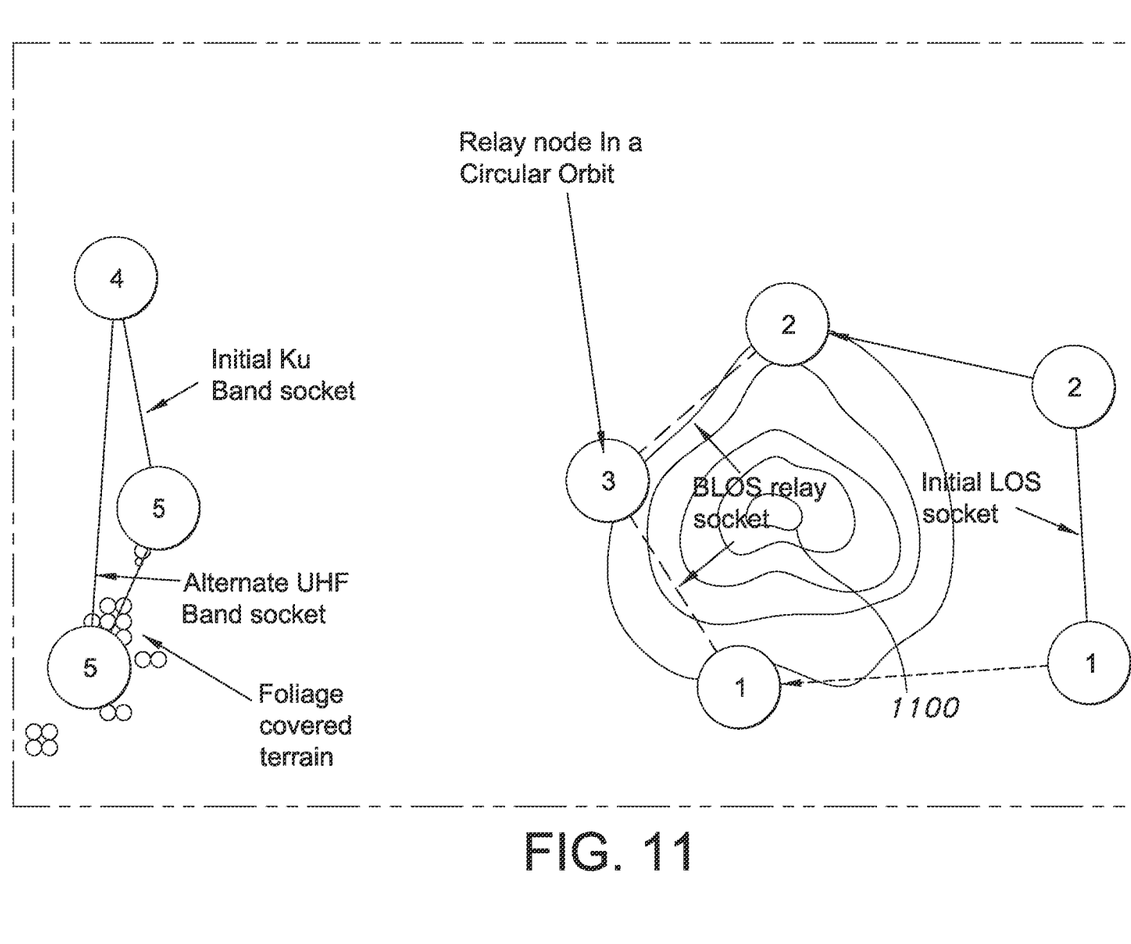
FIG. 11 shows an example of policy execution in an environment with terrain features.

As part of the CNMS architecture, a terrain awareness engine is built into the system. The terrain awareness system uses digital terrain elevation (DTED) data and corresponding node position to assist in line of sight (LOS) calculation between CNMS nodes. For demonstration purposes, the testbed uses artificial GPS information and node position is displayed to a geographical map to visualize movement. A graphical depiction of the scenario is shown in FIG. 11. To demonstrate terrain awareness, Node 1 first opens a socket to Node 2. As the nodes continue on a path around opposite sides of the mountain 1100, the CNMS continuously checks the intervisibility between the nodes. When LOS becomes occluded, the terrain policy is fired and notifies the nodes to search for an alternate path. As a result, a multihop socket is created via Node 3 which is loitering over the top of the mountain. LOS is continually checked between nodes 1 and 2 and, when they once again are within LOS, the single hop socket is restored.

The third experiment demonstrated with the CNMS testbed is automatic socket adaptation. As mentioned before, the socket link is actually a conglomeration of many different waveforms—each having different performance characteristics. To demonstrate the flexibility of CNMS we have implemented socket type adaptation. For this experiment we have encoded areas of the terrain map as foliage covered terrain as shown in FIG. 11. We begin with a Ku frequency band socket between nodes 4 and 5. Although Ku band waveforms exhibit very high bandwidth characteristics due to the abundance of spectrum, they are not well suited for operation in foliage covered terrain. Thus, in our demonstration scenario, node 5 moves to a position which has been coded as high foliage. During socket operation, the CNMS terrain policy continuously monitors the knowledgebase for information about a nodes current terrain type. When node 5 moves into the foliage covered area the policy that suggests how to improve performance in foliage covered terrain is activated and the according modification is made. For our demo, the policy states that the socket type should be adapted from the Ku waveform to a UHF waveform. This concept can be extended to cover various terrain types and waveforms by generating policies according to specific terrain and waveform characteristics. In addition, machine learning techniques may be used to learn which waveform is best suited for the existing environmental conditions.

Finally, we demonstrated the cognitive spectrum awareness features discussed of the system. For this experiment we simulated a jammer by injecting packet loss on the socket communication link. We simulated both a sweeping jammer and a single channel jammer. The jamming avoidance learning algorithm discussed above was implemented and tested in the experimental testbed with results similar to the simulation results.

What is claimed is:

1. A mobile ad-hoc network (MANET), comprising:
   a plurality of wireless RF nodes, configured to communicate with each other:
   wherein each of said plurality of nodes comprises: a communication node with a radio platform which includes a radio control system (RCS) which comprises:
   an engines layer including at least one sensor engine configured to collect sensor information relating to a location of the communication node;
   an RCS core including at least a database storing system settings and policies, the RCS core is configured to communicate with the engines layer, receive the sensor information and store it in the database, and control the operations of engines layer and the radio platform based on the policies; and
   a cognition/learning based analysis module configured to receive the sensor information from the RCS core, to analyze the effects of the policies based on the sensor information, and to modify the policies and store them in the database to improve system performance;
   wherein the at least one sensor engine includes a spectrum adaptive tuning engine;
   wherein the spectrum adaptive tuning engine is a wideband spectrum sensor and is configured to collect spectrum information.

2. The system of claim 1, wherein the engines layer further includes a learning engine configured to optimize the system settings, wherein the RCS core is further configured to receive the system settings from the learning engine and stores the system settings in the database, and wherein the cognition/learning based analysis module is further configured to analyze the effects of the policies based on the sensor information and the system settings.

3. The system of claim 1, wherein the at least one sensor engine includes a terrain awareness tuning engine.

4. A mobile ad-hoc network (MANET) comprising:
   a plurality of wireless RF nodes, configured to communicate with each other:
   wherein each of said plurality of nodes comprises: a communication node with a radio platform which includes a radio control system (RCS) which comprises:
   an engines layer including at least one sensor engine configured to collect sensor information relating to a location of the communication node;
   an RCS core including at least a database storing system settings and policies, the RCS core is configured to communicate with the engines layer, receive the sensor information and store it in the database, and control the operations of engines layer and the radio platform based on the policies; and
   a cognition/learning based analysis module configured to receive the sensor information from the RCS core, to analyze the effects of the policies based on the sensor information, and to modify the policies and store them in the database to improve system performance;
   wherein the at least one sensor engine includes a terrain awareness tuning engine;
   wherein the terrain awareness tuning engine is configured to collect GPS information including a terrain type.

5. The system of claim 4, wherein the RCS core is configured to select a waveform for the radio platform based on the policies and the terrain type.

6. A mobile ad-hoc network (MANET) comprising:
   a plurality of wireless RF nodes, configured to communicate with each other:
   wherein each of said plurality of nodes comprises: a communication node with a radio platform which includes a radio control system (RCS) which comprises:
   an engines layer, including at least one sensor engine configured to collect sensor information relating to a location of the communication node;
   an RCS core including at least a database storing system settings and policies, the RCS core is configured to communicate with the engines layer, receive the sensor information and store it in the database, and control the operations of engines layer and the radio platform based on the policies; and
   a cognition/learning based analysis module configured to receive the sensor information from the RCS core, to analyze the effects of the policies based on the sensor information, and to modify the policies and store them in the database to improve system performance;
   wherein the engines layer further includes a learning engine configured to optimize the system settings, wherein the RCS core is further configured to receive the system settings from the learning engine and stores the system settings in the database, and wherein the cognition/learning based analysis module is further configured to analyze the effects of the policies based on the sensor information and the system settings;
wherein the learning engine optimizes system settings including a transmitter power of the radio platform, a detection threshold, and a transmission rate of the radio platform.

7. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the engines layer further includes a learning engine configured to optimize the system settings, wherein the RCS core is further configured to receive the system settings from the learning engine and stores the system settings in the database, and wherein the cognition/learning based analysis module is further configured to analyze the effects of the policies based on the sensor information and the system settings;
wherein the learning engine optimizes system settings utilizing a genetic learning algorithm.

8. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the engines layer further includes a learning engine configured to optimize the system settings, wherein the RCS core is further configured to receive the system settings from the learning engine and stores the system settings in the database, and wherein the cognition/learning based analysis module is further configured to analyze the effects of the policies based on the sensor information and the system settings;
wherein the learning engine optimizes system settings utilizing a particle swarm optimization algorithm.

9. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the RCS core includes a policy reasoner which is configured to control the operations of engines layer and the radio platform based on the policies.

10. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the database further stores a mission file which indicates the policies and a specific set of engines in the engines layer to be used for a particular mission.

11. The system of claim 10, wherein the RCS core further includes a mission controller for selecting the policies and the specific set of engines in the engines layer based on a selected mission correspond to an entry in the mission file.

12. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the database in an XML knowledge base.

13. A mobile ad-hoc network (MANET) comprising:
a plurality of wireless RF nodes, configured to communicate with each other:
wherein each of said plurality of nodes comprises: a communication node with a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the database also stores a protocol data exchange file which specifies a subset of the system settings and polices that are to be shared with other communication nodes.

14. The system of claim 13, wherein the RMS core includes an RCS message protocol module configured to direct the transmission of the subset of system setting and policies to the other communication nodes based on the protocol data exchange file.

15. A mobile ad-hoc network (MANET) comprising:
a plurality of wireless RF nodes, configured to communicate with each other;
wherein each of said plurality of nodes comprises: a radio platform which includes a radio control system (RCS) which comprises:
an engines layer including at least one sensor engine configured to collect sensor information relating to a location of the communication node;
an RCS core including at least a database storing system settings and policies, the RCS core is configured to communicate with the engines layer, receive the sensor information and store it in the database, and control the operations of engines layer and the radio platform based on the policies; and
a cognition/learning based analysis module configured to receive the sensor information from the RCS core, to analyze the effects of the policies based on the sensor information, and to modify the policies and store them in the database to improve system performance;
wherein the at least one sensor engine includes a spectrum sensor and is configured to collect spectrum information.

* * * * *